(12) United States Patent
Larky et al.

(10) Patent No.: US 6,311,294 B1
(45) Date of Patent: Oct. 30, 2001

(54) DEVICE AND METHOD FOR EFFICIENT BULK DATA RETRIEVAL USING A UNIVERSAL SERIAL BUS

(75) Inventors: Steven P. Larky, Del Mar; Scott Swindle, San Diego; Steve Kolokowsly, San Diego; Mark McCoy, San Diego, all of CA (US)

(73) Assignee: Cypress Semiconductor Corp., San Jose, CA (US)

( * ) Notice: Subject to any disclaimer, the term of this patent is extended or adjusted under 35 U.S.C. 154(b) by 0 days.

(21) Appl. No.: 09/176,047

(22) Filed: Oct. 20, 1998

(51) Int. Cl.$^7$ ...................................................... G06F 13/00
(52) U.S. Cl. .................................. 714/44; 710/33; 710/63
(58) Field of Search ................................ 710/1, 129, 105, 710/33, 100, 63, 32; 714/4, 799, 44; 709/200, 253; 370/464; 711/100

(56) References Cited

U.S. PATENT DOCUMENTS

| | | | |
|---|---|---|---|
| 4,866,606 | 9/1989 | Kopetz | 364/200 |
| 4,890,222 | 12/1989 | Kirk | 364/200 |
| 5,388,249 | 2/1995 | Hotta et al. | 395/550 |
| 5,392,421 | 2/1995 | Lennartsson | 395/550 |
| 5,402,394 | 3/1995 | Turski | 368/10 |
| 5,461,723 | 10/1995 | Shah et al. | 395/293 |
| 5,621,902 | 4/1997 | Cases et al. | 395/309 |
| 5,628,001 | 5/1997 | Cepuran | 395/556 |
| 5,630,147 | 5/1997 | Datta et al. | 395/750 |
| 5,642,489 | 6/1997 | Bland et al. | 395/308 |
| 5,675,813 | 10/1997 | Holmdahl | 395/750 |
| 5,748,911 | 5/1998 | Maguire et al. | 395/281 |
| 5,748,923 | 5/1998 | Eitrich | 395/309 |
| 5,754,799 | 5/1998 | Hiles | 395/290 |
| 5,767,844 | 6/1998 | Stoye | 345/212 |
| 5,774,744 | 6/1998 | Story et al. | 395/847 |
| 5,778,218 | 7/1998 | Gulick | 395/558 |
| 5,781,028 | 7/1998 | Decuir | 326/30 |
| 6,012,115 | * 1/2000 | Chambers et al. . | |
| 6,122,676 | * 9/2000 | Brief et al. . | |
| 6,173,355 | * 1/2001 | Falik et al. . | |

OTHER PUBLICATIONS

Universal Serial Bus Specification, Revision 1.0, Jan. 15, 1996, pp. 1–267.
Intel USB Mobile System Design Guidelines, Revision 1.0, Nov. 6, 1996, pp. 1–19.
Universal Serial Bus and the Multimedia PC, by Kosar A. Jaff, 1996, pp. 1–9.
Intel USB Voltage Drop and Droop Measurement, Nov. 18, 1996, pp. 1–19.

* cited by examiner

Primary Examiner—Gopal C. Ray
(74) Attorney, Agent, or Firm—Christopher P. Maiorana, P.C.

(57) ABSTRACT

A USB device for communicating data from the device to a USB host is provided. The USB device may have an interrupt or isochronous endpoint for communicating interrupts to the host and a bulk data endpoint for communicating bulk data to the host. The USB device may communicate a signal over the interrupt or isochronous endpoint to the host indicating that the device has bulk data to communicate to the host and may communicate bulk data over the bulk endpoint in response to bulk data requests from the host generated based on the signal over the interrupt or isochronous endpoint. The device may count a predetermined period of time when the device is generating a NAK signal in response to the bulk data request signals from the host because the device does not have any bulk data, and may communicate a signal over the bulk endpoint to the host, once the predetermined period of time has elapsed, indicating that the host halts the bulk data requests until another signal over the interrupt or isochronous endpoint is received.

39 Claims, 4 Drawing Sheets

DEVICE AND METHOD FOR EFFICIENT BULK DATA RETRIEVAL USING A UNIVERSAL SERIAL BUS

BACKGROUND OF THE INVENTION

This invention relates generally to a device and method for data retrieval over an electrical bus which connects various peripheral components of a computer system together, and in particular to a device and method which provides efficient bulk data retrieval over a Universal Serial Bus (USB).

A typical personal computer system has a main central processing unit (CPU) enclosed within a housing and one or more peripheral devices, such as a keyboard, a mouse, a monitor, a modem or a printer connected to the housing and electrically connected to the CPU by a unique connector and an electrical bus, respectively. These different connectors and electrical buses include serial buses, parallel buses and RS-232 ports. Typically, each of these different buses had different signaling requirements and different connectors to the housing. For example, a parallel bus has a certain physical connector and communicates bits of data in parallel (i.e., a predetermined number of bits at the same time). In contrast, a serial bus may have a different physical connector and may transmit bits of data in a serial manner (i.e., one bit at a time).

In order to connect a keyboard, printer, monitor, modem or mouse to the personal computer, it was often necessary to use several different types of local electrical buses and associated ports, such as a serial port for a modem, a parallel port for the printer, a keyboard port and a mouse port. This leads to unnecessary complexity since each peripheral device may use a different bus. Therefore, a new universal serial bus (USB) was created to provide a standard interconnect for peripherals, and to facilitate connecting peripheral devices to the computer. The USB not only replaces the multiple cables and physical connectors typically needed with a single standardized connection system, it provides a standard electrical specification. The USB also permits peripheral devices to be connected and/or disconnected from the bus while the computer system is powered up which eliminates the need, with conventional buses, to power down and "re-boot" every time that a peripheral device is connected or disconnected. The USB further permits a peripheral connected to the USB to be detected and then a configuration process for the device, known as enumeration, may be commenced.

In any USB architecture, there is a single master (the USB host) which communicated with one or more slaves (the USB devices). Between each USB host and each USB device, there may be one or more communication/data flows which may include a control flow, an interrupt flow, a bulk flow and an isochronous flow as described below. Within each USB device interface, there may be one or more logical endpoints which have unique endpoint addresses so that each endpoint corresponds to the one or more communication/data flows. Each endpoint is a uniquely identifiable portion of a USB device that is the end of a particular communications flow between the host and the device. Each endpoint may communicate data in only one direction (e.g., an "IN" direction to the host and an "OUT" direction to the device interface). Thus, for each USB interface, there may be four different types of endpoints which accommodate control data flows, interrupt data flows, bulk data flows and isochronous data flows.

Each different endpoint and communications flow has different characteristics which are suited for the particular type of data being transferred. For example, the control, interrupt and bulk endpoints have built-in error checking and resend to guarantee data integrity while the isochronous endpoint has less built in error checking and no ability to resend. As another example, isochronous and interrupt or isochronous endpoints, and to some extent control endpoints, have a guaranteed bandwidth while the bulk endpoint does not have a guaranteed bandwidth. The control endpoint is particularly suited for communicating commands to a USB device while the interrupt or isochronous endpoint is particularly suited for communicating one data packet (e.g., no more than 64 bytes) at a specified interval, such as no more than once per frame (about 1 mS). The bulk endpoint is suited for communicating raw data that requires data integrity, but that is not time sensitive while the isochronous endpoint is suited for raw data which is time sensitive and needs a certain number of bytes passed per frame, but that is not sensitive to data corruption or data loss.

Some software applications which utilize the USB (USB applications) may use the bulk data IN endpoint of the USB to communicate data from the USB device interface back to the host. For example, USB applications that require low latency, error-checked, high throughput retrieval of bulk data from the device which needs to be communicated at an unpredictable rate often use the bulk IN endpoint. The problem with using the bulk IN endpoint is that the bulk endpoints have no bandwidth guarantee and therefore may suffer from severe latency problems in retrieving the data. This problem is exacerbated when the bulk data arrives at unpredictable times because there is no guarantee that any bandwidth will be available at the time the bulk data is ready for retrieval. Therefore, the host driver of the USB device which is receiving the data is not guaranteed to get the data as soon as it wants it and it also does not know when the data will be available for retrieval.

In typical USB devices, a brute force solution to this problem with the bulk IN endpoint is used. In particular, the device driver via the operating system will continuously send bulk data request signals (known as IN tokens) to the device which will be responded to with "not acknowledged" signals (NAKs) repetitively by the device until some bulk data is generated by the device. Once there is bulk data to be communicated, the IN tokens are responded to with the data instead of the NAKs. Once all of the bulk data has been communicated, the device returns to the state of sending NAKs in response to the IN tokens until more bulk data is ready to be communicated. This process may be referred to as the conventional "pending-IN" process.

Although this pending-IN process incurs the least latency in retrieving bulk data from the device since bulk data is retrieved as soon as it is available, the pending-IN process generates it own problems because it is inefficient. In particular, the pending-In process places extra burden on the USB bus because of the constant sending of the IN tokens and the NAKs even when no bulk data is available. In addition, since the USB host controller typically utilizes the host computer's central processing unit (CPU) and system bus, this pending-IN process degrades not only the performance and throughput of the USB bus, but also the overall system performance of the host computer. This degradation of the USB bus and host computer's performance is not acceptable. A second problem with this approach is that, unlike a data response, the NAK from the device does not reset the error count in the USB host. Thus, if three errors (missing or corrupted NAK packets) accumulate during the time that the device is sending NAKs, then the device may appear broken to the USB host. Thus, it is desirable to provide a device and method for efficient bulk data retrieval over a USB which avoids the problems of the conventional pending-IN process, and it is to this end that the present invention is directed.

SUMMARY OF THE INVENTION

In accordance with the invention, a device and method for efficient bulk data retrieval over a USB is provided which solves the problems associated with the pending-IN strategy described above without incurring too much additional latency. In particular, the method may be interrupt-driven while achieving the low latency and high data throughput of the conventional pending-IN strategy. In more detail, the method may use an interrupt or isochronous endpoint and a "dry" flag, as described below in more detail, that is sent from the bulk endpoint to provide an efficient bulk data retrieval.

In more detail, the USB device may send a bulk data available signal over the interrupt or isochronous endpoint to the host. The host, prior to receiving the bulk data available signal, is in a stand-by mode in which it is waiting for bulk data, but is not generating and sending the IN tokens. Once the data available signal is received, the host begins sending the IN tokens to retrieve the bulk data. Once the device does not have any more bulk data (i.e., the device is dry), it sends NAKs back to the host in response to the IN tokens. After a predetermined period of time of sending NAKs, the device sends a dry signature signal which instructs the host to stop sending any more IN tokens until another data available signal is received over the interrupt or isochronous endpoint. Therefore, the host is only using the bus to send IN tokens during the bulk data transfer and for some predetermined time thereafter which reduces the burden on the bus. The predetermined time after the completion of the bulk data transfer permits the device in accordance with the invention to avoid stopping the bulk data transfer process merely due to a brief gap in the bulk data.

Thus, in accordance with the invention, a method for communicating data from a universal serial bus (USB) device to a USB host over a universal serial bus is provided in which the USB device indicates to the host that data is available for communication to the host and the host communicates data requests to the device once the data available signal is received by the host. Then, the data is communicated from the device to the host. Once the device has no more data to transfer for a predetermined period of time, the device communicates a flag to the host indicating that no more data is retrievable and the host halts the data requests when the flag is received. A system for communicating data is also provided.

DETAILED DESCRIPTION OF A PREFERRED EMBODIMENT

The invention is particularly applicable to a method and system for a USB host retrieving data over a bulk endpoint of a USB device using the universal serial bus and it is in this context that the invention will be described. It will be appreciated, however, that the device and method in accordance with the invention has greater utility.

Figure 1:
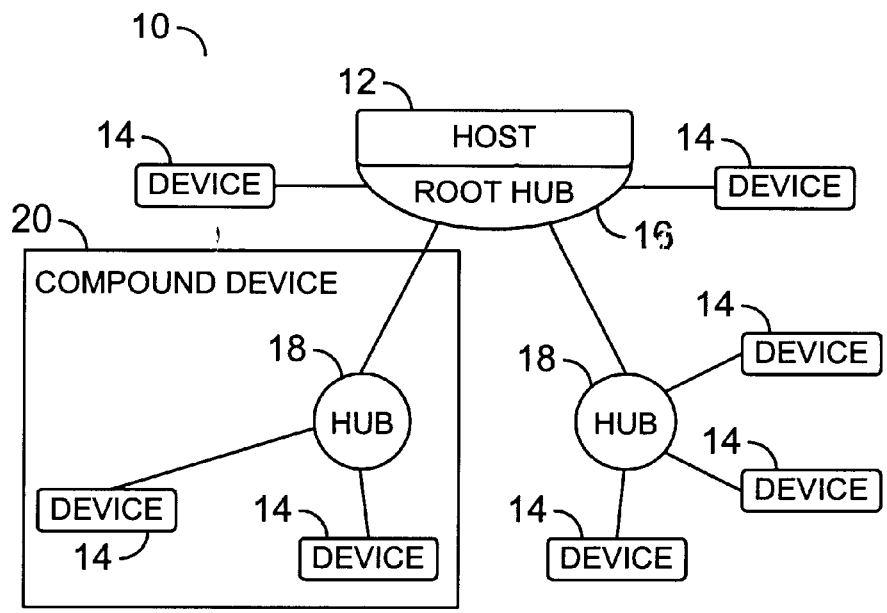
FIG. 1 is a diagram illustrating the physical layout of a USB host and the USB devices.

FIG. 1 is a diagram illustrating the physical layout of a USB system 10 and in particular, a USB host 12 and one or more USB devices 14. As shown, the host 12 may include a root hub 16 to which all of the USB devices 14 are either directly or indirectly connected. Some of the USB device are directly connected to the root hub 16 while other USB devices are connected to the root hub 16 through a secondary hub 18. It is also possible to form a compound USB device 20 which may include a secondary hub 18 and one or more USB devices 14. These USB devices 14 may be a variety of different peripheral devices, such as a printer, a CD-ROM player, a mouse, a keyboard, and the like. As described above, using the USB, a plurality of different devices may be connected to the host 12 using a single bus architecture. Now, the logical architecture of the host and the USB device will be described.

Figure 2:
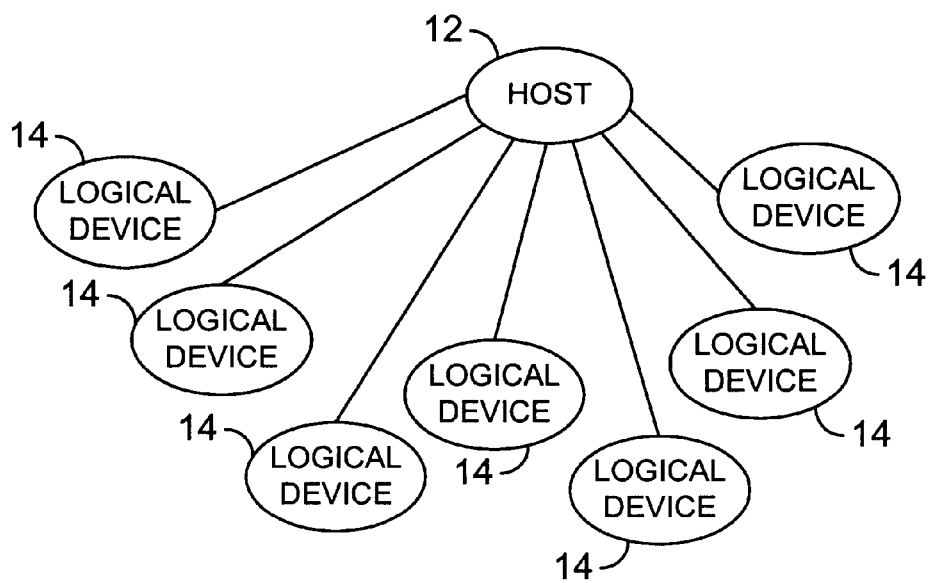
FIG. 2 is a diagram illustrating the logical layout of a USB host and the USB devices.

FIG. 2 is a diagram illustrating the logical layout of the USB host 12 and the USB devices 14. Although the devices 14 are physically connected to the host 12 in a tiered star topology as shown in FIG. 1, the host 12 communicates with each device 14 as if it is directly connected to the root hub. Therefore, the logical layout of the USB host 12 and the USB devices 14 shows that each USB device is logically connected directly to the host even through the actual physical connection may be through a secondary hub as shown in FIG. 1. The USB architecture, as is well known, is a single master data bus. Now, the communications of data between the host 12 and a particular USB device 14 will be described.

Figure 3:
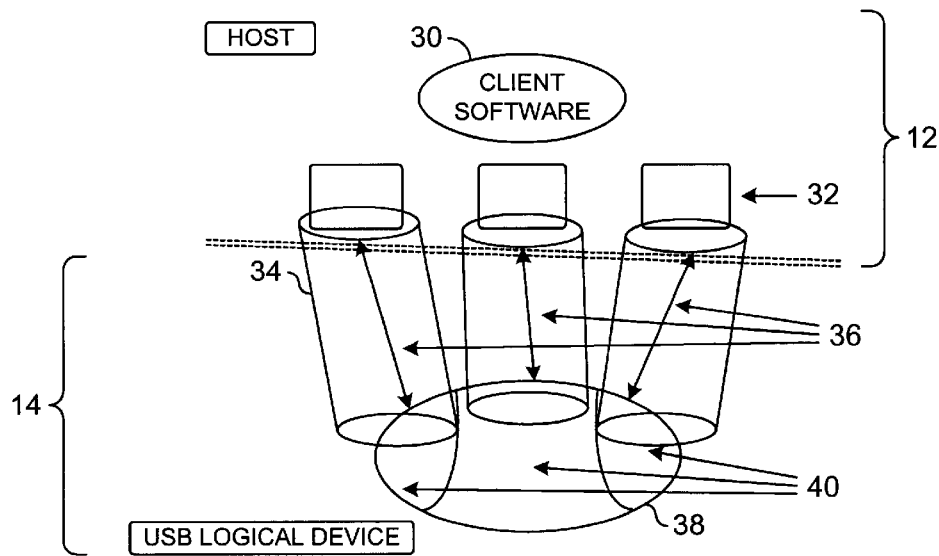
FIG. 3 is a diagram illustrating the flow of various data streams between the USB host and a USB device.

FIG. 3 is a diagram illustrating the various data streams which connect the USB host 12 and a USB device 14. As shown, the host 12 may include a piece of client software 30 and one or more buffers 32 which receive data from the USB device 14. Each buffer 32 in the host may be connected to a corresponding logical data pipe 34. Each logical data pipe 34 may permit a different communications flow 36 to be formed between the host and the USB device. In the example shown, there may be three different communications flows between the host and USB device which may include, for example, an interrupt communications flow, a bulk data communications flow and a control data communications flow. Each different communications flow permits different types of data to be communicated between the host and the USB device as described above.

The USB device 14 may include an interface 38 which may include one or more logical endpoints 40 which are each connected to the other ends of one of the communications flows 36. Each of these endpoints may accomplish the communication of a particular type of data corresponding over the corresponding communications flow 36. In addition, each endpoint may be assigned a particular communications direction so that one endpoint may transmit bulk data back to the host (bulk IN endpoint) while another endpoint may receive bulk data from the host (bulk OUT endpoint). In a typical USB device, there may be a plurality of these logical endpoints which each have logical addresses. The combination of the endpoints 40, the associated communication flows 36 and the buffers 32 permit the USB host 12 and the particular USB device 14 to communicate data with each other. The purpose of each different type of endpoint and the type of data it may communicate is set forth in the USB specification and will not be described here.

As described above, to communicate bulk data from the USB device to the USB host in a typical USB system, a pending-IN process is used. Although this pending-IN process incurs the least latency in retrieving bulk data from the device, the pending-IN process generates its own problems because it is inefficient. In particular, the pending-IN process places extra burden on the USB bus because of the constant sending of the IN tokens and the NAKs. In addition, since the USB host controller typically utilizes the host computer's central processing unit (CPU) and system bus, this pending-IN process degrades not only the performance and throughput of the USB bus, but also the overall system performance of the host computer. This degradation of the USB bus and host computer's performance is not acceptable. Thus, it is desirable to provide a device and method for efficient bulk data retrieval over a USB which avoids the problems of the conventional pending-IN process. Now, a USB host and a USB device which may retrieve bulk data in accordance with the invention will be described which overcomes the limitations of the conventional pending-IN process.

Figure 4:
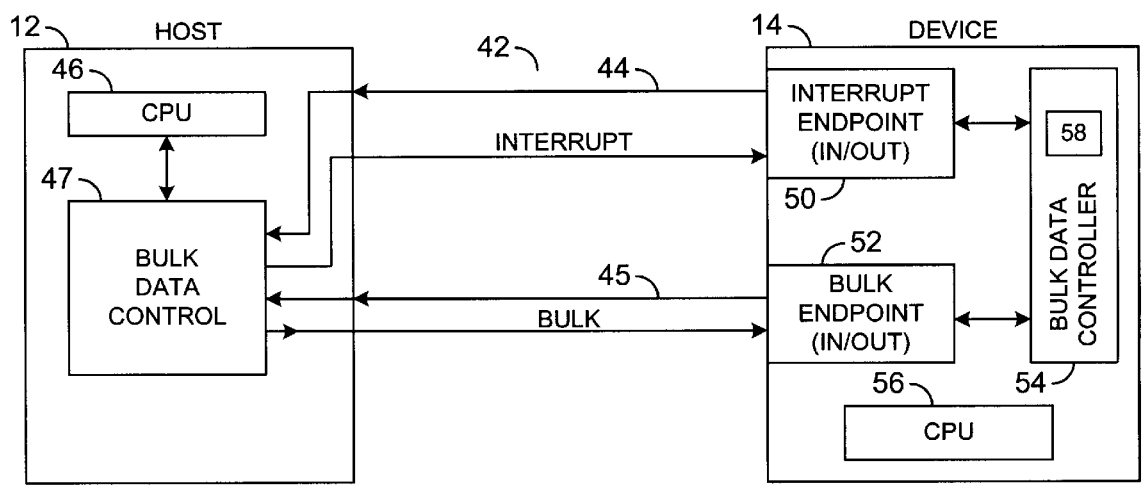
FIG. 4 is a diagram illustrating the details of a USB host and a USB device which can perform the bulk data retrieval in accordance with the invention.

FIG. 4 is a diagram of the USB host 12 and the USB device 14 connected together by a USB bus 42 so that the USB host may efficiently retrieve bulk data from the USB device in accordance with the invention. For purposes of this description, only an interrupt communications flow 44 and a bulk data communications flow 45 of the USB bus are shown although there may be additional communications flows as described above. The host 12, which may be a typical personal computer, may include a central processing unit (CPU) 46 and a bulk data controller 47 which is controlled by the CPU. The bulk data controller controls the bulk data retrieval process in accordance with the invention. An embodiment of the bulk data controller will be described below in detail with reference to FIG. 6. The bulk data controller may actually be a software application being executed by the CPU 46 so that an inefficient bulk data retrieval system and method may degrade the performance of the CPU. The bulk data controller may be connected to the interrupt and bulk data communications flows.

The USB device 14 may include an interrupt or isochronous endpoint 50 and a bulk endpoint 52 as described above. For purposes of this description, a single interrupt or isochronous endpoint and bulk data endpoint which handle both incoming and outgoing data are shown for clarity, but it is understood that, in a typical USB system, there are separate endpoints for each direction of data communications. The endpoints 50, 52 may be connected to a bulk data controller 54 which controls the bulk data retrieval process within the device. The bulk data controller 54 may be a software application being executed by a CPU or microcontroller 56 embedded within the device. The bulk data controller 54 may include a timer 58 which counts a predetermined time-out period in accordance with the invention. Now, a method for efficient bulk data retrieval over the USB in accordance with the invention which uses the device described above will be described.

Figure 5:
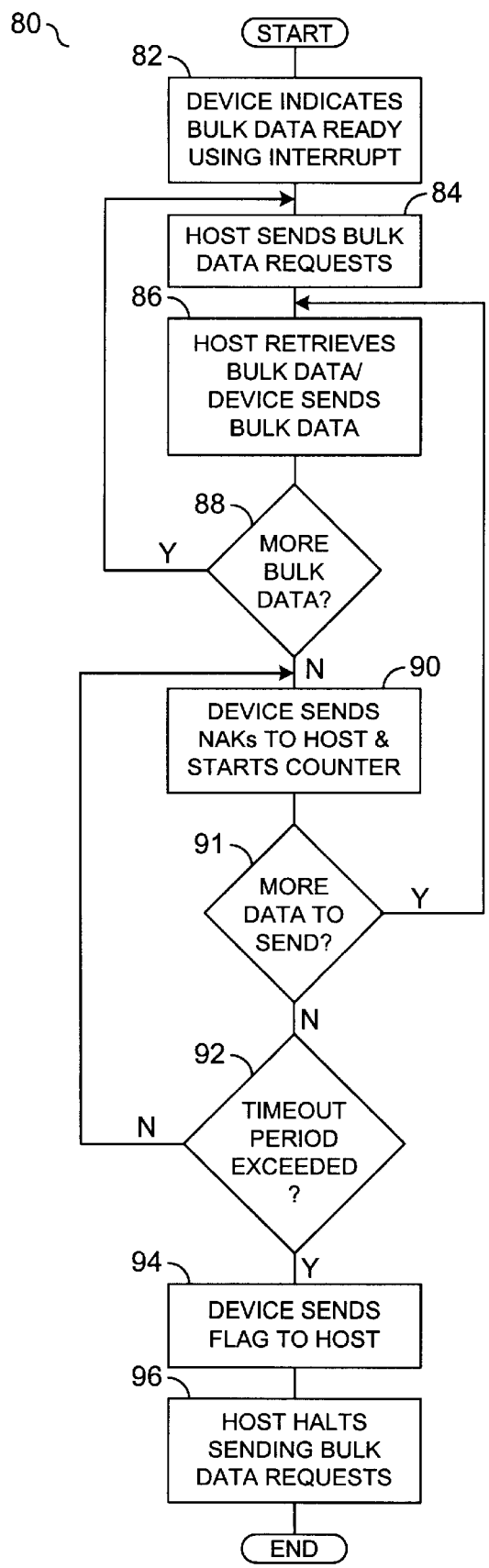
FIG. 5 is a flowchart illustrating a method for bulk data retrieval in accordance with the invention.

FIG. 5 is a flowchart illustrating a method 80 for bulk data retrieval from a USB device by a USB host in accordance with the invention. This method solves the problems introduced by the conventional pending-IN process while still retaining low latency. Instead of having the host continuously sending IN tokens to the device, the method, at step 82, initiates the bulk data retrieval process by having the device generate a signal which indicates that bulk data is currently in the device and ready to be communicated to the host. In a preferred embodiment, a signal may be sent to the host over the interrupt communications flow and the interrupt or isochronous endpoint which will be described in more detail below. Thus, in accordance with the invention, the host does not have to continuously send the IN tokens to determine when there is bulk data ready since the device now alerts the host that bulk data exists using the interrupt communications flow.

Once the host receives the bulk data available signal from the device, it generates and sends one or more bulk data request signals (IN tokens) in step 84 to the device and the host, in step 86, receives the bulk data over the bulk data communications flow. The system may determine if there is any additional bulk data in step 88 and, as long as there is more bulk data to be communicated, the method loops back to step 84 and the host continues to send bulk data request signals to the device. Once there is no more bulk data to be sent, the device, in step 90, sends not acknowledge signals (NAKs) back to the host and starts a time-out counter. In step 91, the device checks to ensure that no data is available. If additional data is now available, then the device resumes sending data and loops back to step 86. Thus, the method efficiently handles a gap in the data that is less than the predetermined time-out period. In step 92, the device determines if a predetermined time-out period has been exceeded based on the counter. In a preferred embodiment, the time-out period may be programmable using 8 bits and therefore may have a value of between 0 and 255 data frames.

If the time-out period has not been exceeded, then the method loops back to step 90 and the device continues to send NAKs in response to the bulk data requests from the host. If the time-out period has been exceeded, then in step 94, the device may generate and communicate a flag to the host over one of the communications flows indicating that the device has no more bulk data and has entered a timed-out state. In step 96, the host, in response to the received flag, may halt its transmission of the bulk data request signals to the device until the host again receives a bulk data ready signal from the device.

This method ensures that the host only transmits the bulk data request signals during the time it is retrieving the bulk data from the device and some predetermined time-out period thereafter so that the bulk data retrieval process in accordance with the invention does not place extra burden on the USB bus and does not degrade the performance of the host CPU. Using this method, the only time that the host may incur more latency than the current pending-IN process is to begin the initial data retrieval after the host receives the interrupt signal. This minimal increased latency, however, is insignificant as compared to the decreased burden on the USB bus and the decreased performance degradation. Now, the method will be described in more detail and in particular a state machine being executed by the host to accomplish the method will be described.

Figure 6:
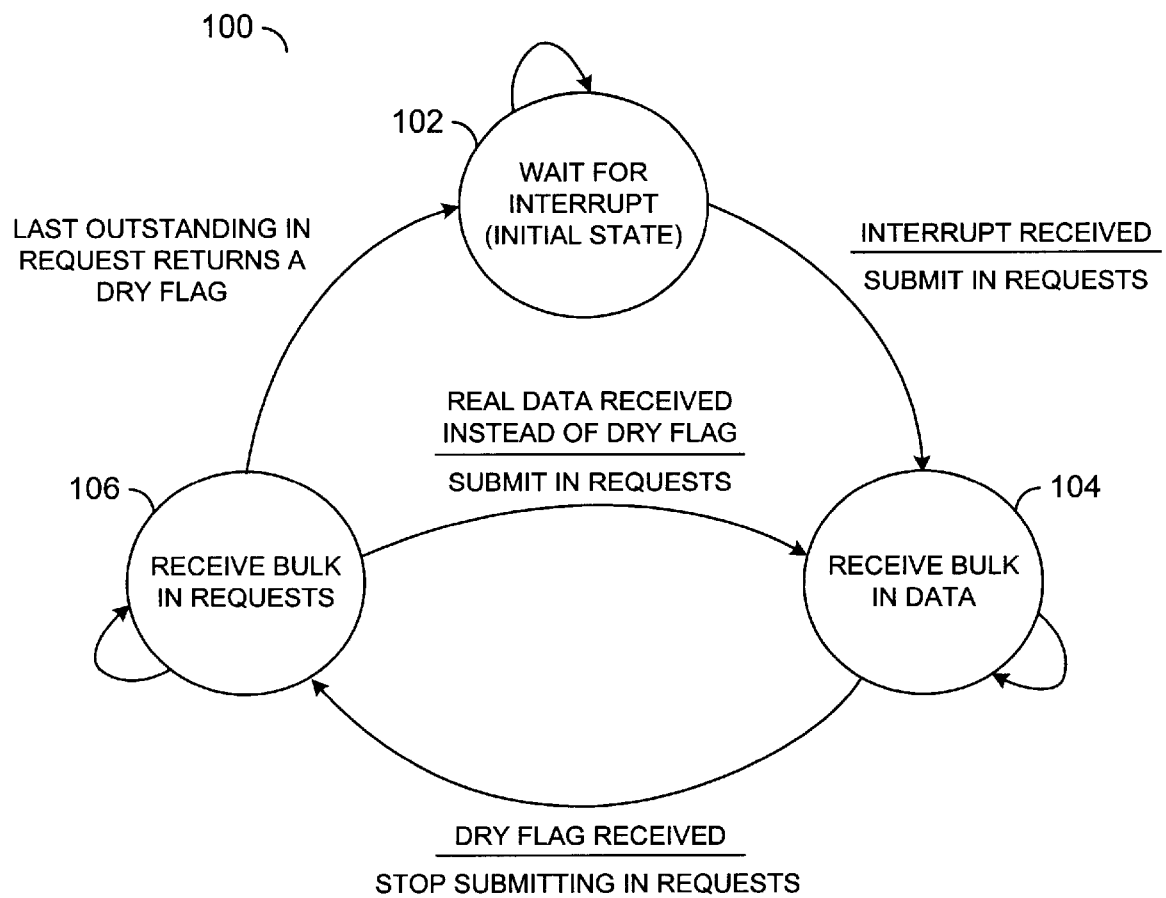
FIG. 6 is a state diagram illustrating the states of a state machine in the USB host for the bulk data retrieval method in accordance with the invention.

FIG. 6 is a state diagram 100 illustrating the states of a state machine in the USB host for the retrieval of bulk data in accordance with the invention. The state diagram may include a Wait for Interrupt state 102, which in the initial state, a Retrieve Bulk IN Data state 104, and a Retire Bulk IN Requests state 106. Each of these states and the transitions between these states will be now be described.

At initialization of the state machine, the host assumes that the bulk data endpoint in the particular USB device does not contain any bulk data to retrieve (i.e., the bulk endpoint is dry) and thus waits in state 102 until it receives an interrupt signal from the device before it takes any action with respect to the bulk endpoint. Within the USB device, the interrupt or isochronous endpoint may communicate NAK signals by default and then return data only when the bulk IN endpoint has gone from dry (i.e., no bulk data being ready to send) to non-dry (i.e., bulk data being ready for communication). After the interrupt signal has been successfully transmitted to the host (as determined by the device endpoint successfully receiving an acknowledge (ACK) signal from the host), the device goes back into a state of sending NAKs over the interrupt or isochronous endpoint until the bulk endpoint again transitions from the dry state to the non-dry state. In another embodiment, the transition of the bulk endpoint from a dry state to a non-dry state may be signaled by a change in the data being returned on a continuously responding interrupt or isochronous endpoint.

The data that is actually sent over the interrupt or isochronous endpoint is implementation dependent, however it is the presence of data or a change in the data that signals to the host that bulk data may now be retrieved from the device. In a preferred embodiment, the data sent over the interrupt or isochronous endpoint may include a status report which may indicate, to the host, various pieces of information such as how much bulk data is currently queued up at the bulk endpoint in the device when the interrupt data is sent from the device to the host. The status report, therefore, provides the USB host and the USB device with a communications path between them.

Once the host has received the successful interrupt signal from the device, the state machine transitions into the Retrieve Bulk IN Data state 104 and will begin sending bulk data request signals (e.g., IN tokens) to the bulk endpoint in the device to retrieve the bulk data. As long as there is bulk data, the host continues to send the IN tokens. In particular, while in the data retrieval state 104, the host may keep one or more IN data requests pending to be executed by the USB host controller (i.e., the host CPU) so that there is a minimum delay between the IN tokens when retrieving the data. The bulk endpoint in the device eventually runs out of bulk data (i.e., goes dry) and starts sending NAKs in response to the IN tokens. After a predetermined time-out period during which the device is sending NAKs, as described below in more detail, the device may generate a signal indicating that there is no more bulk data (e.g., a dry flag signature).

In many applications, the bulk data flow may be such that when the bulk data does arrive, it will come in a burst of small sized chunks that are separated by relatively short idle times. Then, the flow of data will end for a relatively long period of time until another burst of chunks starts. It is not desirable to have the IN tokens stop during the short idle times since this would be inefficient and slow. On the other hand, during the relatively long period of time (i.e., the dry state), it is desirable to halt the IN tokens to reduce the burden on the bus as described above. In accordance with the invention, the time-out period which attempts to characterize the period during which the device is dry, is programmable so that an optimal combination of constant IN tokens during the short idle times and halting the IN tokens during the longer idle periods may be achieved.

In accordance with the embodiment of the invention shown, the counting of the USB data frames may be used as a determination of the time-out period. However, the time-out period may also be based on any other measure of time which provides sufficient time resolution to capture the time period when the bulk endpoint is dry. In a preferred embodiment, the time-out period may be programmable using 8-bits so that the time-out period may be between 0 and 255 data frames. The time-out period may be changed based on, for example, the particular characteristics of a particular operating system on which the USB system is connected. For example, a particular operating system, during any file transfer, may introduce 5 mS gaps into the data transfer at various points during the data transfer. Therefore, the time-out period would be adjusted so that the 5 mS period would be considered a short idle time so that the host continues to send IN tokens during these short gaps. The time-out period may be changed by the operating system or may be continuously adjustable so that, as bulk data is being transferred, the time-out period may be adjusted to achieve the best bulk data transfer possible.

Returning to the state diagram, when the device bulk endpoint has sent NAKs back to the host in response to the bulk data requests for the time-out period, the device will send a "dry flag" signature so that the host state machine enters the Retire Bulk IN Requests state 106. The "dry flag" is a unique data signature that the host can recognize as being an indicator that the bulk endpoint is dry. When the state machine enters the state 106, it halts the submission of new IN tokens. The host, however, may still have one or more outstanding bulk IN requests. The device may respond to these outstanding IN tokens with a "dry flag" signature if the bulk endpoint still does not contain any bulk data or with bulk data if it is now again ready to communication to the host. If the outstanding IN tokens are met with dry flags, then the state machine goes into the Wait for Interrupt state 102 and the bus no longer has to communicate any IN tokens. If, however, the host receives real data from the bulk endpoint in response to any of the outstanding IN tokens, then the state machine may return to the Retrieve Bulk IN data state 104 and resume the normal bulk data retrieval mode of operation including generating more pending IN tokens and stay in that state until the dry flag is again received.

In the particular embodiment described, the dry flag signature may be a sequence of sixty-five bytes of zeros back to the host in response to two IN tokens. In particular, the maximum packet size for a bulk endpoint is sixty-four bytes so that the dry flag consists of sending a sixty-four byte packet of zeros and then a one byte packet of zeros. The second abbreviated packet is known as a "short" packet in USB terminology which typically marks the end of a bulk transfer.

In accordance with the invention, the bulk data retrieval system and method permits bulk data retrieval without the problems associated with typical pending-IN processes. In addition, the method permits the time-out period to be adjusted to accommodate a variety of different time-out periods. In addition, the method permits a status report to be communicated to the host prior to the bulk data retrieval.

While the foregoing has been with reference to a particular embodiment of the invention, it will be appreciated by those skilled in the art that changes in this embodiment may be made without departing from the principles and spirit of the invention, the scope of which is defined by the appended claims.

What is claimed is:

1. A method for communicating data from a universal serial bus (USB) device to a USB host over a universal serial bus, comprising:

communicating the data from the device to the host in response to data requests;

communicating a flag from the device to the host when the device has not received data for a predetermined time; and halting the data requests when the flag is received by the host.

2. The method of claim 1, wherein the method further comprises generating an interrupt signal which is communicating via an interrupt or isochronous endpoint in the USB device.

3. The method of claim 2, wherein generating said interrupt signal comprises generating a status report indicating the amount of data to be retrieved by the host from the device.

4. The method of claim 1, wherein communicating data requests comprises communicating IN tokens from the host to the USB device.

5. The method of claim 1, wherein communicating the flag comprises communicating a data signature indicating that the USB device does not have any more data to be retrieved by the host.

6. The method of claim 1, wherein said data comprises bulk data and wherein communicating the data comprises communicating the bulk data over a bulk endpoint of the USB device.

7. The method of claim 1 further comprises countingdown a time-out period between when the USB device does not have any data and when the flag is generated.

8. The method of claim 7, wherein counting down the time-out period comprises adjusting the total length of the time-out period.

9. The method of claim 8, wherein the counting down the time-out period comprises counting down one or more USB data frames.

10. The method of claim 7, wherein counting down the time-out period further comprises receiving additional data requests from the host, generating not acknowledge signals in response to the additional data requests if there is not any data in the device.

11. The method of claim 10, wherein receiving additional data requests comprises communicating data in response to the data requests if data is again present in the device and resetting the time-out period until the device is again out of data.

12. A system for communicating data from a USB device to a USB host over a USB bus, comprising:

means in the device for communicating a data available signal to the host indicating that data is available to send to the host;

means in the host for communicating data requests to the device once the data available signal is received by the host;

means in the device for communicating the data from the device to the host in response to the data requests;

means in the device for communicating a flag to the host when the device has not had retrievable data for a predetermined time; and means in the host for halting the data requests when the flag is received by the host.

13. The system of claim 12, wherein the means for communicating the data available signal comprises an interrupt or isochronous endpoint in the USB device for generating an interrupt signal to the host.

14. The system of claim 13, wherein the interrupt or isochronous endpoint further comprises means for generating a status report indicating the amount of data to be retrieved by the host from the device.

15. The system of claim 12, wherein means for communicating the data requests comprises means for communicating IN tokens from the host to the USB device.

16. The system of claim 12, wherein means for communicating the flag comprises means for communicating a data signature indicating that the USB device does not have any more data to be retrieved by the host.

17. The system of claim 12, wherein said data comprises bulk data and wherein the means for communicating the bulk data comprises a bulk endpoint of the USB device.

18. The system of claim 12 further comprises a counter for counting down a time-out period between when the USB device does not have any data and when the flag is generated.

19. The system of claim 18, wherein the counter comprises a programmable counter so that the total length of the time-out period is adjustable.

20. The system of claim 19, wherein the programmable counter counts down one or more USB data frames.

21. The system of claim 18, wherein the counter further comprises means for receiving additional data requests from the host and means for generating not acknowledge signals in response to the additional data requests if there is not any data in the device.

22. The system of claim 21, wherein the means for receiving additional data requests comprises means for communicating data in response to the data requests if data is again present in the device and means for resetting the time-out period until the device is again out of data.

23. A USB device which communicates bulk data to a USB host over the USB bus, the device comprising:

means for generating an interrupt signal indicating that bulk data is available for communication to the USB host;

means, in response to bulk data requests received from the host, for communication of the bulk data to the host; and means for generating a flag for a predetermined time following when no bulk data is available at the device so that the host stops sending the bulk data requests.

24. The device of claim 23, wherein the means for generating the interrupt signal comprises an interrupt or isochronous endpoint in the USB device.

25. The device of claim 24, wherein the interrupt or isochronous endpoint further comprises means for generating a status report indicating the amount of data to be retrieved by the host from the device.

26. The device of claim 23, wherein the device further comprises means for communicating a data signature indicating that the USB device does not have any more data to be retrieved by the host.

27. The device of claim 23, wherein the means for communicating the bulk data comprises a bulk endpoint of the USB device.

28. The device of claim 23 further comprises a counter for counting down a time-out period between when the USB device does not have any data and when the flag is generated.

29. The device of claim 28, wherein the counter comprises a programmable counter so that the total length of the time-out period is adjustable.

30. The device of claim 29, wherein the programmable counter counts down one or more USB data frames.

31. The device of claim 28, wherein the counter further comprises means for receiving additional data requests from the host and means for generating not acknowledge signals in response to the additional data requests if there is not any data in the device.

32. The device of claim 31, wherein the means for receiving additional data requests comprises means for communicating data in response to the data requests if data is again present in the device and means for resetting the time-out period until the device is again out of data.

33. A USB host which retrieves bulk data from a USB device over a USB bus, the host comprising:

means for receiving a data available signal from the device indicating that data is available to send to the host;

means for communicating data requests to the device once the data available signal is received by the host;

means for retrieving the bulk data from the device in response to the data available signal;

means for receiving a flag from the device when the device has not had retrievable data for a predetermined time; and means for halting the data requests when the flag is received by the host.

34. The host of claim 33, wherein the host further comprises means for receiving a status report indicating the amount of data to be retrieved by the host from the device.

35. The host of claim 33, wherein means for communicating the data requests comprises means for communicating IN tokens from the host to the USB device.

36. The host of claim 33, wherein means for receiving the flag comprises means for receiving a data signature indicating that the USB device does not have any more data to be retrieved by the host.

37. The host of claim 33, wherein the means for retrieving the bulk data comprises a bulk data communicating flow from a bulk endpoint of the USB device.

38. A USB device for communicating data from the device to a USB host, the device having an interrupt or isochronous endpoint for communicating interrupts to the host and a bulk data endpoint for communicating bulk data to the host, the device comprising:

means for communicating a signal over the interrupt or isochronous endpoint to the host indicating that the device has bulk data to communicate to the host;

means for communicating bulk data over the bulk data endpoint in response to bulk data requests from the host generated based on the signal over the interrupt or isochronous endpoint;

means for counting a predetermined period of time when the device is generating a NAK signal in response to the bulk data requests from the host because the device does not have any bulk data; and means for communicating a signal over the bulk endpoint to the host, once the predetermined period of time has elapsed, indicating that the host halts the bulk data requests until another signal over the interrupt or isochronous endpoint is received.

39. A USB device configured to communicate bulk data to a USB host over a USB bus, the device comprising:

a first circuit configured to generate an interrupt signal indicating that bulk data is available for communication to the USB host;

a second circuit configured to communicate the bulk data to the host in response to bulk data requests received from the host; and a third circuit configured to generate a flag for a predetermined time following when no bulk data is available at the device so that the host stops sending the bulk data requests.

* * * * *